United States Patent Office 2,764,562
Patented Sept. 25, 1956

2,764,562

PHOSPHONATED CATION EXCHANGE RESINS AND METHOD OF MAKING THE SAME

Lewis R. Drake, Boulder, Colo., assignor to The Dow Chemical Company, Midland, Mich., a corporation of Delaware No Drawing. Application November 2, 1954,
Serial No. 466,433

12 Claims. (Cl. 260—2.2)

This invention concerns the acidic and salt forms of certain new cation exchange resins. It relates more particularly to insoluble resinous compositions of polymers of monovinyl aromatic compounds cross-linked with divinyl aromatic compounds, which polymers contain on the aromatic nuclei substituent methylene phosphonic acid groups of the formula —$CH_2$—$PO(OH)_2$. It also relates to salts of such copolymer methylene phosphonic acids. The invention also concerns a method of making the resinous compositions.

The new resinous insoluble compositions are prepared by reacting a trialkyl phosphite with an insoluble cross-linked copolymer of one or more monovinyl aromatic compounds and a divinyl aromatic compound, which copolymer contains on the aromatic nuclei substituent chloromethyl groups, whereby a polymeric composition containing on the aromatic nuclei substituent methylene dialkyl phosphonate groups of the formula

—$CH_2$—$P(O)(OR)_2$

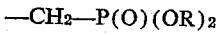

wherein R is an alkyl radical, is formed and hydrolyzing the dialkyl phosphonate whereby the corresponding phosphonic acid group is formed. Thus, the compositions of the invention consist of a resinous insoluble polymer of one or more monovinyl aromatic compounds cross-linked with a divinyl aromatic compound which polymer contains on the aromatic nuclei substituent methylene phosphonate groups, e. g. methylene phosphonic acid groups of the formula —$CH_2$—$PO(OH)_2$, or corresponding methylene phosphonate salt radicals.

The resinous compositions are insoluble in water and aqueous solutions of acids or alkalies, e. g. an aqueous 10 weight per cent solution of hydrochloric acid, sulfuric acid, sodium hydroxide, or potassium hydroxide. They are insoluble in organic liquids such as methyl alcohol, ethyl alcohol, butyl alcohol, acetone, ethylene dichloride, benzene, toluene, carbon tetrachloride, xylene, or chlorobenzene. The resinous compositions are suitable for repeated use and regeneration in sorbing cations from fluids. When used in the treatment of basic fluids, e. g. an aqueous solution of sodium hydroxide, the hydrogen form of the resin exchanges its hydrogen atoms for the metal ions of the alkali present in the solution with the result that the base is removed from the fluid and phosphonic acid groups of the resin are converted to a salt.

The term "phosphonate group" used herein pertains to the phosphonic acid group and salts thereof.

The insoluble cross-linked copolymers containing substituent chloromethyl groups on the aromatic nuclei can be prepared by first polymerizing a mixture of from 80 to 99.5 per cent by weight of one or more monovinyl aromatic compounds such as styrene, vinyltoluene, vinylxylene, ethylvinylbenzene, isopropylstyrene, chlorostyrene, dichlorostyrene, ar-chlorovinyltoluene, or ar-chloroethylbenzene and from 20 to 0.5 per cent by weight of a divinyl aromatic hydrocarbon, e. g. divinylbenzene, divinyltoluene, divinylxylene, or ethyldivinylbenzene, by any of a variety of well-known methods employed for the polymerization of styrene, and thereafter introducing substituent chloromethyl groups on aromatic nuclei in the copolymer. Copolymers of at least 80 per cent by weight of styrene, or vinyltoluene, together with lesser amounts of ethylvinylbenzene and from 0.5 to 10 per cent of divinylbenzene, are preferred.

Chloromethyl groups are introduced into the insoluble cross-linked copolymer by reacting the copolymer in the form of small particles with a chloromethylating agent such as a mixture of paraformaldehyde and hydrochloric acid, or chloromethyl methyl ether and a Friedel-Crafts catalyst, e. g. zinc chloride, stannic chloride, or aluminum chloride. Methods of chloromethylating which may be used in introducing the chloromethyl group onto aromatic nuclei of the insoluble cross-linked copolymer are described in "Organic Reactions," vol. I, chapter 3, page 63 (John Wiley & Sons, New York city, 1952). The chloromethylation of the copolymer is preferably carried out by treating the copolymer in the form of small particles with chloromethyl methyl ether and a Friedel-Crafts catalyst at temperatures between 20° and 60° C.

The extent of the chloromethylation reaction can be conveniently determined by analysis. It is desirable that as many chloromethyl groups as possible be introduced into the insoluble copolymer because the number of such groups determines the number of phosphonic acid groups in the final product. The number of the phosphonic acid groups determines the ultimate capacity of the resin to absorb cations. The chloromethylation reaction is usually continued until the copolymer contain an average of at least one substituent chloromethyl group for every ten aromatic nuclei in the copolymer. From a practical standpoint, the insoluble copolymers preferably contain an average of from 4 to 15 chloromethyl groups for every 10 aromatic nuclei in the copolymer.

In an alternative procedure, insoluble cross-linked vinyl aromatic copolymers containing substituent chloromethyl groups on the aromatic nuclei are prepared by first forming a copolymer of one or more monovinyl aromatic compounds containing the methyl radical as nuclear substituent such as vinyltoluene, vinylxylene, or ar-chlorovinyltoluene, cross-linked with from 0.5 to 20 per cent by weight of divinylbenzene, by polymerizing a mixture of the monomeric materials in usual ways and reacting the insoluble copolymer in the form of small particles with chlorine in the presence of a side chain halogenation catalyst, whereby a chlorine atom is substituted for a hydrogen atom on methyl radicals in the copolymer.

Chlorination of the insoluble cross-linked copolymers containing methyl radicals directly attached to carbon atoms of the aromatic nucleus, can readily be carried out by reacting the copolymer in the form of small particles with chlorine at temperatures between —10° and 150° C. in the presence of a halogenation catalyst such as phosphorus, phosphorus trichloride, ultraviolet light, or a combination of light and phosphorus trichloride, promoting substitution of the chlorine for hydrogen attached to carbon atoms of the methyl radicals on aromatic nuclei in the copolymer, while the insoluble copolymer in granular form is dispersed in, or swollen by, an organic liquid such as carbon tetrachloride, benzene, chlorobenezene, acetic acid, or ortho-dichlorobenzene, and at atmospheric or substantially atmospheric pressure.

The chlorination reaction to effect the substitution of a chlorine atom for a hydrogen atom in a methyl radical on an aromatic nucleus in the copolymer is usually accompanied, at least to some extent, by substitution of chlorine atoms on aromatic nuclei in the copolymer, but such nuclear chlorination is not disadvantageous. The insoluble cross-linked copolymer is usually reacted with from 0.5 to 2 gram molecular proportions of chlorine for each substituent methyl radical on an aromatic nucleus in the copolymer based on a gram molecular equivalent weight of the copolymer. Such chlorinated insoluble cross-linked copolymers containing an average of from 0.1 to 1.5 chloromethyl groups per aromatic nucleus in the copolymer can be employed as starting materials in preparing the resinous compositions of the invention.

The trialkyl phosphite starting material can be a tertiary alkyl phosphite of the formula P(OR)$_3$ wherein R represents an alkyl radical containing from one to eight carbon atoms. Examples of suitable trialkyl phosphites are trimethyl phosphite, triethyl phosphite, tributyl phosphite, triisopropyl phosphite, or triisooctyl phosphite.

In practice, finely divided, insoluble cross-linked copolymers of the above-mentioned type, i. e. containing chloromethyl groups as substituents on aromatic nuclei of the copolymer, are reacted with a trialkyl phosphite. Chlorine is thereby displaced from the chloromethyl radical and a polymeric composition containing methylene dialkyl phosphonate groups as substituents on aromatic nuclei of the copolymer is formed. This polymeric composition is hydrolyzed to convert the dialkyl phosphonate groups into phosphonic acid groups or corresponding phosphonate salt groups.

Reaction of the trialkyl phosphite with the insoluble cross-linked vinyl aromatic copolymer containing substituent chloromethyl radicals on the aromatic nuclei can be carried out at temperatures between about 100° and 200° C., preferably from 140° to 180° C. at atmospheric or substantially atmospheric pressure. The reaction can be carried out while the finely-divided copolymer is dispersed in and swollen by a liquid medium such as toluene, xylene, chlorobenzene, or ortho-dichlorobenzene. The trialkyl phosphites also swell the copolymer. The reaction is preferably carried out by dispersing the copolymer in granular form in the trialkyl phosphite and employing it as both reactant and reaction medium. The reaction is usually carried out by heating the mixture to a refluxing temperature at atmospheric pressure or thereabout. The resultant phosphorated copolymer is separated from the liquid in usual ways, e. g. by filtering, and may be washed with water, or an organic liquid such as diethyl ether, toluene, or orthodichlorobenzene, to free the copolymer from unreacted trialkyl phosphite. The phosphorated copolymer containing methylene dialkyl phosphonate groups on aromatic nuclei is subjected to hydrolysis by heating the same with an aqueous solution of a halogen acid, e. g. an aqueous solution containing 20 per cent by weight or more of hydrochloric, hydrobromic, or hydroiodic acid, or with an aqueous solution of an alkali such as sodium hydroxide or potassium hydroxide. The hydrolysis can readily be carried out by heating the insoluble copolymer, containing the substituent methylene dialkyl phosphonate groups on the aromatic nuclei, in admixture with the aqueous solution of acid, or alkali, at temperatures between 100° and 140° C. and at atmospheric or superatmospheric pressure. A final washing of the product with water results in the obtaining of the resin in the hydrogen, i. e. the phosphonic acid form, or the salt form, depending upon whether an acid, or an alakil, is employed in the hydrolysis of the dialkyl phosphonate groups. Hydrolysis of the dialkyl phosphonate groups is preferably carried out employing a concentrated aqueous solution of hydrochloric or hydrobromic acid.

The products of the invention are insoluble resinous cross-linked vinyl aromatic copolymer containing, on the aromatic nuclei, substituent methylene phosphonic acid groups. As prepared, they are resinous insoluble phosphonic acids, or salts thereof. They can readily be converted from the hydrogen, i. e. the acid, form to a salt form, e. g. the sodium, potassium, calcium or magnesium salt, by washing with an aqueous solution of an alkali or a salt. Conversely, the salt form of the resin can readily be converted to the hydrogen form by washing with an aqueous solution of an acid. The resinous compositions are capable of repeated use in absorbing ions and being regenerated.

The following examples illustrates ways in which the principle of the invention has been applied, but are not to be construed as limiting its scope.

*Example 1*

A charge of 10 grams (15 cc.) of a batch of a chloromethylated copolymer of 90 per cent by weight of styrene, 4 per cent of ethylvinylbenzene and 6 per cent divinylbenzene was placed in a glass reaction vessel equipped with a reflux condenser and stirrer. The chloromethylated copolymer contained 18.2 per cent by weight of chlorine by analysis and was in the form of rounded granules of sizes between 20 and 50 mesh per inch as determined by U. S. Standard screens. A charge of 72.5 grams (75 cc.) of triethyl phosphite was added. The mixture was stirred and heated at temperatures between 150° and 155° C. over a period of 5 hours, then cooled to room temperature. The treated copolymer was separated by filtering and was washed with water. The phosphorated copolymer, together with 200 cc. of an aqueous solution of hydrochloric acid in concentration between 25 and 30 per cent by weight, was placed in a glass reaction vessel equipped with a reflux condenser and stirrer. The mixture was stirred and heated at a refluxing temperature (about 110° C.) over a period of 16 hours. The resin was separated from the liquor by filtering and was washed with water until the wash-water was free from acid, i. e. was neutral to litmus paper. The product had a cation exchange capacity corresponding to 57,800 grains of calcium carbonate per cubic foot of a bed of the resin. The resin granules were capable of repeated use in absorbing ions and being regenerated.

*Example 2*

A charge of 2.5 grams (5 cc.) of a chloromethylated copolymer of 98.5 per cent by weight of styrene, 1 per cent of ethylvinylbenzene and 0.5 per cent of divinylbenzene, together with 25 cc. of triethylphosphite, was placed in a glass reaction vessel and the mixture heated at temperatures between 150° and 155° C. for a period of 5 hours. The chloromethylated copolymer employed in the experiment contained 19.3 per cent by weight of chlorine and was in the form of rounded granules of sizes between 20 and 50 mesh per inch as determined by U. S. Standard screens. The reacted copolymer was separated from the excess triethyl phosphite by filtering and was washed with water. The phosphorated copolymer, together with 200 cc. of an aqueous 6-normal hydrochloric acid solution, was placed in a glass reaction vessel and the mixture heated at 110° C. for 2 hours. The resin was separated from the liquor by filtering and was washed with water until the wash-water was no longer acid to litmus paper. The final product had a cation exchange capacity corresponding to 12,700 grains of calcium carbonate per cubic foot of a bed of the water-swollen resin granules.

*Example 3*

A charge of 6 grams (10 cc.) of a chloromethylated copolymer of 87.5 per cent by weight of styrene, 5 per cent of ethylvinylbenzene and 7.5 per cent of divinylbenzene, was placed in a glass reaction vessel equipped with a reflux condenser. The chloromethylated copolymer contained 15.3 per cent by weight of chlorine by analysis and was in the form of rounded granules of sizes between 20 and 50 mesh per inch. A charge of 50 cc. (46 grams) of tributyl phosphite was added. The mixture was heated at a temperature of 150° C. for a period of 5 hours, then cooled. The treated copolymer was separated from the unreacted tributyl phosphite by filtering and was washed with water. The phosphorated copolymer, together with 250 cc. of an aqueous 12-normal hydrochloric acid solution, was placed in a glass reaction vessel and the mixture heated at refluxing temperatures for a period of 2.5 hours. The resin was separated from the liquor by filtering and was washed with water until the wash-water was neutral to litmus paper. The final product had a cation exchange capacity corresponding to 32,600 grains of calcium carbonate per cubic foot of a bed of the resin.

I claim:

1. An insoluble resinous phosphorated composition suitable for the removal of cations from fluids which comprises an insoluble cross-linked copolymer of a mixture of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent of a divinyl aromatic hydrocarbon, the said copolymer containing as substituents on the aromatic nuclei thereof, at least 1 methylene phosphonate group per 10 aromatic nuclei.

2. An insoluble resinous phosphorated composition, as claimed in claim 1, wherein the number of the substituent methylene phosphonate groups is between 5 and 15 for every 10 aromatic nuclei in the copolymer.

3. An acidic form of an insoluble resinous composition, as claimed in claim 2, wherein at least part of the phosphonate groups are methylene phosphonic acid radicals of the formula $-CH_2P(O)(OH)_2$.

4. An insoluble resinous phosphorated composition as claimed in claim 2, which comprises an insoluble cross-linked copolymer of at least 80 per cent by weight of styrene, a lesser amount of ethylvinylbenzene, and from 0.5 to 10 per cent of divinylbenzene, having methylene phosphonate groups as substituents on aromatic nuclei of the copolymer molecule.

5. An insoluble resinous phosphorated composition as claimed in claim 2, which comprises an insoluble cross-linked copolymer of from 80 to 99.5 per cent by weight of styrene and from 0.5 to 20 per cent of divinylbenzene, having methylene phosphonate groups as substituents on aromatic nuclei of the copolymer molecule.

6. A method of making an insoluble resinous phosphorated composition suitable for the removal of cations from fluids, which method comprises reacting a tertiary alkyl phosphite having the general formula $P(OR)_3$ wherein R is an alkyl radical containing from 1 to 8 carbon atoms, with an insoluble cross-linked copolymer of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent of a divinyl aromatic hydrocarbon, the said copolymer containing, as substituents on aromatic nuclei thereof, at least one chloromethyl group for every ten aromatic nuclei, by heating particles of the copolymer in admixture with a liquid medium which swells the copolymer and comprises said tertiary alkyl phosphite at temperatures between 100° and 200° C., whereby chlorine is displaced from the chloromethyl radical and a polymeric composition containing as substituents on aromatic nuclei thereof, methylene dialkyl phosphonate groups of the formula $-CH_2-P(O)(OR)_2$, wherein R is an alkyl radical containing from 1 to 8 carbon atoms, is formed and hydrolyzing the dialkyl phosphonate group.

7. A method of making an insoluble resinous phosphorated composition suitable for the removal of cations from fluids, which method comprises reacting a tertiary alkyl phosphite having the general formula $P(OR)_3$ wherein R is an alkyl radical containing from 1 to 8 carbon atoms, with an insoluble cross-linked copolymer of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent of a divinyl aromatic hydrocarbon, the said copolymer containing, as substituents on aromatic nuclei thereof, from 5 to 15 chloromethyl groups for every 10 aromatic nuclei in the copolymer, by heating particles of the copolymer in admixture with a liquid medium which swells the copolymer and comprises said tertiary alkyl phosphite at temperatures between 100° and 200° C., whereby chlorine is displaced from the chloromethyl groups and a polymeric composition containing as substituents on aromatic nuclei thereof, methylene dialkyl phosphonate groups of the formula $$-CH_2-P(O)(OR)_2$$

wherein R is an alkyl radical containing from 1 to 8 carbon atoms, is formed, and hydrolyzing the dialkyl phosphonate groups.

8. A process as claimed in claim 7, wherein the insoluble cross-linked copolymer, containing as substituents on aromatic nuclei thereof, chloromethyl groups, is a copolymer of at least 80 per cent by weight of styrene, a lesser amount of divinylbenzene, and from 0.5 to 10 per cent of divinylbenzene.

9. A process as claimed in claim 7, wherein the insoluble cross-linked copolymer, containing as substituents on aromatic nuclei thereof, chloromethyl groups, is a copolymer of from 80 to 99.5 per cent by weight of styrene and from 0.5 to 20 per cent of divinylbenzene.

10. A process as claimed in claim 7, wherein the trialkyl phosphite is triethyl phosphite.

11. A process as claimed in claim 7, wherein the trialkyl phosphite is tributyl phosphite.

12. A process as claimed in claim 7, wherein the dialkyl phosphonate groups are hydrolyzed with an aqueous solution of a hydrohalic acid.

References Cited in the file of this patent

Jour. American Chem. Soc., vol. 74, pages 1867–8, April 5, 1952.